(12) United States Patent
Suzuki et al.

(10) Patent No.: US 10,407,551 B2
(45) Date of Patent: Sep. 10, 2019

(54) POLYARYLENE SULFIDE MANUFACTURING METHOD AND POLYARYLENE SULFIDE MANUFACTURING DEVICE

(71) Applicant: Kureha Corporation, Tokyo (JP)

(72) Inventors: Kenji Suzuki, Tokyo (JP); Michihisa Miyahara, Tokyo (JP); Hiroshi Sakabe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 10 days.

(21) Appl. No.: 15/872,210

(22) Filed: Jan. 16, 2018

(65) Prior Publication Data

US 2018/0208717 A1 Jul. 26, 2018

(30) Foreign Application Priority Data

Jan. 16, 2017 (JP) .................................. 2017-005210
Jan. 16, 2017 (JP) .................................. 2017-005211

(51) Int. Cl.
*C08G 75/0209* (2016.01)
*C08G 75/0254* (2016.01)
(Continued)

(52) U.S. Cl.
CPC ............ *C08G 75/0209* (2013.01); *C08F 2/06* (2013.01); *C08F 6/12* (2013.01); *C08F 28/04* (2013.01);
(Continued)

(58) Field of Classification Search
CPC ................ C08G 75/14; C08G 75/0263; C08G 75/0268; C08G 75/0259; C08G 75/025; B30B 9/28
See application file for complete search history.

(56) References Cited

U.S. PATENT DOCUMENTS 5,266,680 A * 11/1993 Reed .................. C08G 75/0259
428/411.1

FOREIGN PATENT DOCUMENTS

JP 2015-218214 A 12/2015

* cited by examiner

*Primary Examiner* — Shane Fang
(74) *Attorney, Agent, or Firm* — Abel Law Group, LLP

(57) ABSTRACT

To provide a polyarylene sulfide (hereinafter, PAS) manufacturing method and PAS manufacturing device that further eliminates processing costs in manufacturing PAS, by recovering from solid content containing an unreacted sulfur source and alkali metal halide produced as a byproduct the sulfur source and the solid content with a reduced amount of the sulfur source, and then conveniently and easily reusing the unreacted sulfur source without performing a large-scale process. A method of manufacturing PAS according to the present invention comprises: a polymerizing step of producing PAS; an extracting step of bringing an extraction solvent into content with solid content produced in the polymerizing step, and extracting at least a portion of a sulfur source from the solid content; a recovering step of separating and recovering the solid content passing through the extracting step and an extraction liquid produced in the extracting step; and a recycling step of supplying at least a portion of the extraction liquid preferably as at least a portion of PAS produced raw material in the polymerizing step; where the extraction solvent is (1) a protic organic solvent or (2) a mixed solvent containing water and an organic solvent, and the amount of the sulfur source in the solid content recovered in the recovering step is 2 parts by mass or less with regard to 100 parts by mass of the alkali metal halide.

10 Claims, 3 Drawing Sheets

(51) Int. Cl.
*C08G 75/0259* (2016.01)
*C08F 28/04* (2006.01)
*C08F 2/06* (2006.01)
*C08F 6/12* (2006.01)
*C08G 75/0281* (2016.01)

(52) U.S. Cl.
CPC ..... *C08G 75/0254* (2013.01); *C08G 75/0259* (2013.01); *C08G 75/0281* (2013.01)

POLYARYLENE SULFIDE MANUFACTURING METHOD AND POLYARYLENE SULFIDE MANUFACTURING DEVICE

CROSS-REFERENCE TO RELATED APPLICATIONS

This application claims the benefit of Japanese Patent Application No. 2017-005211 and 2017-005210 filed Jan. 16, 2017, the disclosure of which is herein incorporated by reference in its entirety.

TECHNICAL FIELD

The present invention relates to a method of manufacturing polyarylene sulfide and a polyarylene sulfide manufacturing device.

BACKGROUND ART

Polyarylene sulfides (hereinafter, referred to as "PAS") as represented by polyphenylene sulfides (hereinafter, referred to as "PPS") are engineering plastics having excellent heat resistance, chemical resistance, flame retardant properties, mechanical strength, electrical properties, dimensional stability, and the like. PAS can be formed into various molded products, films, sheets, fibers, or the like by a general melt processing method such as extrusion molding, injection molding, compression molding, and the like. Therefore, the PAS is generally used in a wide variety of technical fields such as electrical apparatuses, electronic apparatuses, automotive apparatuses, packaging materials, and the like.

An alkali metal halide (for example, NaCl) produced as a byproduct when manufacturing PAS is disposed as wastewater. A sulfur source as an unreacted raw material is included in the byproduct. From the perspective of processing cost and environmental pollution prevention, the unreacted sulfur source is expected to be recovered and reused. For example, Patent Document 1 discloses a technique of washing a byproduct using a large amount of water, an acid is added to the washing liquid to produce hydrogen sulfide, the hydrogen sulfide is reacted with an alkali metal hydroxide, and then a recovered sulfidizing agent (sulfur source) is reused in a reaction.

CITATION LIST

Patent Literature

Patent Document 1: JP 2015-218214 A (Published on Dec. 7, 2015)

SUMMARY OF INVENTION

Technical Problem

In Patent Document 1, the sulfidizing agent (sulfur source) and organic substances are included as unreacted raw material along with alkali metal halide in the wastewater. Therefore, disposing as it is difficult, and a chemical oxygen demand (COD) reducing process of the wastewater and the like is required. Furthermore, in the technique according to Patent Document 1, multi-step water washing over a long period of time is required, and a very large-scale complicated process is required due to a large amount of wastewater being produced, and thus the technique is still insufficient from the perspective of eliminating processing costs.

In view of the foregoing, an object of the present invention is to provide: a PAS manufacturing method that can recover a sulfur source and a solid content with a reduced amount of the sulfur source from solid content containing an unreacted sulfur source and alkali metal halide produced as a byproduct, without performing a large-scale process; and a PAS manufacturing method and PAS manufacturing device that can further eliminate processing costs in manufacturing PAS by conveniently and easily reusing the unreacted sulfur source.

Solution to Problem

The present inventors discovered a new finding that many sulfur sources are present on a surface of alkali metal halide salt produced as a byproduct, as disclosed in the accompanying drawings, and discovered that the aforementioned problem can be resolved by extracting at least a portion of the sulfur source from the solid content using an extraction solvent which is (1) a protic organic solvent or (2) a mixed solvent containing water and an organic solvent, recovering an extraction liquid containing the extracted sulfur source, and then reusing at least a portion of the extraction liquid, thereby reaching completion of the present invention.

A method of manufacturing PAS according the present invention, comprises:

a polymerizing step of polymerizing a sulfur source and a dihalo aromatic compound in an organic polar solvent to produce PAS;

an extracting step of bringing an extraction solvent into contact with solid content produced in the polymerizing step, the solid content containing an alkali metal halide and the sulfur source, and then extracting at least a portion of the sulfur source from the solid content; and a recovering step of mutually separating and recovering the solid content where at least a portion of the sulfur source was extracted in the extracting step, and an extraction liquid containing the extraction solvent and the sulfur source, produced in the extracting step; wherein the extraction solvent is (1) a protic organic solvent or (2) a mixed solvent containing water and an organic solvent; and the amount of the sulfur source in the solid content recovered in the recovering step is 2 parts by mass or less with regard to 100 parts by mass of the alkali metal halide.

A PAS manufacturing device according to the present invention, comprising:

a polymerizing part that polymerizes a sulfur source and dihalo aromatic compound in an organic polar solvent to produce PAS;

an extracting part that brings an extraction solvent into contact with solid content produced in the polymerizing part, the solid content containing an alkali metal halide and the sulfur source, and then extracts at least a portion of the sulfur source from the solid content;

a recovering part that mutually separates and recovers the solid content where at least a portion of the sulfur source was extracted in the extracting part, and an extraction liquid containing the extraction solvent and the sulfur source, produced in the extracting part;

wherein the extraction solvent is (1) a protic organic solvent or (2) a mixed solvent containing water and an organic solvent; and the amount of the sulfur source in the solid content recovered in the recovering part is 2 parts by mass or less with regard to 100 parts by mass of the alkali metal halide.

Advantageous Effects of Invention

The present invention provides a PAS manufacturing method that can recover, from solid content containing an unreacted sulfur source and alkali metal halide produced as a byproduct, the sulfur source and the solid content with a reduced amount of the sulfur source without performing a large-scale process.

Furthermore, the present invention provides a PAS manufacturing method and PAS manufacturing device that further eliminates processing costs for manufacturing PAS, by conveniently and easily reusing the unreacted sulfur source.

DESCRIPTION OF EMBODIMENTS

PAS Manufacturing Method

Figure 1:
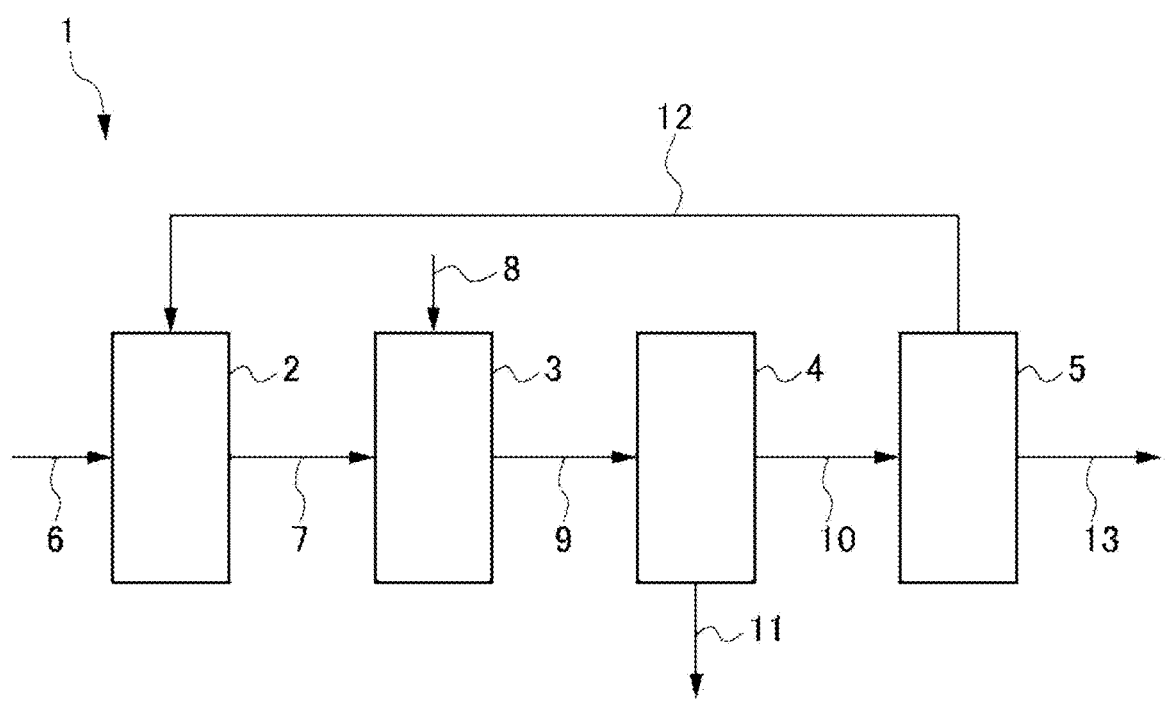
FIG. 1 is a schematic view illustrating one embodiment of a PAS manufacturing device according to the present invention.

A method of manufacturing PAS according to one embodiment of the present invention, comprises:

a polymerizing step of polymerizing a sulfur source and a dihalo aromatic compound in an organic polar solvent to produce PAS;

an extracting step of bringing an extraction solvent into contact with solid content produced in the polymerizing step, the solid content containing an alkali metal halide and the sulfur source, and then extracting at least a portion of the sulfur source from the solid content; and a recovering step of mutually separating and recovering the solid content where at least a portion of the sulfur source was extracted in the extracting step, and an extraction liquid containing the extraction solvent and the sulfur source, produced in the extracting step; wherein the extraction solvent is (1) a protic organic solvent or (2) a mixed solvent containing water and an organic solvent; and the amount of the sulfur source in the solid content recovered in the recovering step is 2 parts by mass or less with regard to 100 parts by mass of the alkali metal halide.

The PAS manufacturing method according to one embodiment of the present invention preferably comprises a recycling step of supplying at least a portion of the extraction liquid as at least a portion of raw material for producing PAS in the polymerizing step. With the PAS manufacturing method according to one embodiment of the present invention, extraction of the sulfur source from the solid content can be efficiently performed while suppressing dissolving of the alkali metal halide from the solid content. Note that the sulfur source in the solid content is derived from a sulfur source added in order to supply for a polymerization reaction in the polymerizing step, and indicates an unreacted sulfur source.

Polymerizing Step

In the polymerizing step, a sulfur source and dihalo aromatic compound are polymerized in an organic polar solvent to produce PAS. An organic polar solvent, sulfur source, and dihalo aromatic compound that are normally used in PAS manufacturing can be used.

Examples of the organic polar solvent include: organic amide solvents, aprotic organic polar solvents containing an organic sulfur compound; and aprotic organic polar solvents containing a cyclic organic phosphorus compound. Examples of the organic amide solvents include: N,N-dimethylformamide, N,N-dimethylacetamide, and other amide compounds; N-methyl-ε-caprolactam and other N-alkylcaprolactam compounds; N-methyl-2-pyrrolidone (hereinafter, referred to as "NMP), N-cyclohexyl-2-pyrrolidone, and other N-alkylpyrrolidone compounds or N-cycloalkylpyrrolidone compounds; 1,3-dialkyl-2-imidazolidinone and other N,N-dialkylimidazolidinone compounds; tetramethyl urea and other tetraalkyl urea compounds; hexamethylphosphoric triamide and other hexaalkylphosphoric triamide compounds; and the like. Examples of the aprotic organic polar solvents containing an organic sulfur compound include dimethyl sulfoxide, diphenyl sulfone, and the like. Examples of the aprotic organic polar solvents containing a cyclic organic phosphorus compound include 1-methyl-1-oxophosphorane and the like. Of these, from the perspective of availability, handling properties, and the like, the organic amide solvent is preferable, N-alkylpyrrolidone compounds, N-cycloalkylpyrrolidone compounds, N-alkylcaprolactam compounds, and N,N-dialkylimidazolidinone compounds are more preferable, NMP, N-methyl-ε-caprolactam, and 1,3-dialkyl-2-imidazolidinone are even more preferable, and NMP is particularly preferable. From the perspective of efficiency of the polymerization reaction and the like, the amount of the organic polar solvent used is preferably from 1 to 30 mol, and more preferably from 2 to 15 mol with regard to 1 mol of the sulfur source.

Examples of the sulfur source can include alkali metal sulfides, alkali metal hydrosulfides, and hydrogen sulfide, and the alkali metal sulfides and alkali metal hydrosulfides are preferable. The sulfur source can be handled in an aqueous slurry or aqueous solution condition, and from the perspective of handling properties such as measurability, transportability, and the like, the sulfur source is preferably in an aqueous solution condition. Examples of the alkali metal sulfides include lithium sulfide, sodium sulfide, potassium sulfide, rubidium sulfide, and cesium sulfide. Examples of the alkali metal hydrosulfides include lithium hydrosulfide, sodium hydrosulfide, potassium hydrosulfide, rubidium hydrosulfide, and cesium hydrosulfide.

Examples of the dihalo aromatic compounds include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides, dihalodiphenyl ketones, and the like. Halogen atoms refer to fluorine, chlorine, bromine, and iodine atoms, and two halogen atoms may be the same or different in the dihalo aromatic compound. Of these, from the perspective of availability, reactivity, and the like, p-dihalobenzenes, m-dihalobenzenes, or mixtures thereof are preferable, p-dihalobenzenes are more preferable, and p-dichlorobenzene (hereinafter, referred to as "pDCB") is particularly preferable. The amount of the dihalo aromatic compound used is preferably from 0.90 to 1.50 mol, more preferably from 0.92 to 1.10 mol, and even more preferably from 0.95 to 1.05 mol with regard to 1 mol of the added amount of sulfur source. When the amount used is within the aforementioned range, a decomposition reaction is less likely to occur, a stable polymerization reaction is easy to perform, and a polymer with a high molecular weight is easy to produce.

The organic polar solvent, sulfur source, and dihalo aromatic compound may be independently used, or a mixture of two or more types thereof may be used so long as the combination can allow PAS manufacturing.

The polymerization reaction is a polymerization reaction where a mixture containing the sulfur source and dihalo aromatic compound is heated to initiate the polymerization reaction, such that a polymer with a melt viscosity of not less than 0.1 Pa·s as measured at a temperature of 310° C. and shear rate of 1216 sec$^{-1}$ is produced. In order to obtain PAS with a higher viscosity, the reaction can be performed in two or more stages. The polymerization reaction is preferably a first-stage polymerization reaction of the sulfur source and dihalo aromatic compound, for example. The first-stage polymerization reaction is a polymerization reaction where a mixture containing the sulfur source and dihalo aromatic compound is heated to initiate a polymerization reaction, such that a prepolymer with a conversion ratio of the dihalo aromatic compound is 50% or higher.

For the polymerization reaction, a polymerization reaction is preferably performed under heating at a temperature of 170 to 300° C. from the perspective of efficiency of the polymerization reaction and the like. The polymerization temperature in the polymerization reaction is more preferably within a range of 180 to 280° C. from the perspective of suppressing a side reaction or decomposition reaction. In particular, for the first-stage polymerization, a polymerization reaction is preferably initiated under heating at a temperature of 170 to 270° C. to produce a prepolymer with a conversion ratio of the dihalo aromatic compound of 50% or higher, from the perspective of efficiency of the polymerization reaction and the like. The polymerization temperature in the first-stage polymerization reaction is more preferably selected from a range of 180 to 265° C. from the perspective of suppressing a side reaction or decomposition reaction.

The conversion ratio of the dihalo aromatic compound is preferably 50 to 98%, more preferably 60 to 97%, even more preferably 65 to 96%, and particularly preferably 70 to 95%. The conversion ratio of the dihalo aromatic compound can be calculated by determining the amount of the dihalo aromatic compound remaining in the reaction mixture by gas chromatography, and then performing a calculation based on the residual amount of the dihalo aromatic compound, the added amount of the dihalo aromatic compound, and the added amount of the sulfur source.

The polymerization reaction in the polymerizing step may be performed in a batch or may be continuously performed. For example, in the aforementioned polymerizing step, the polymerization reaction can be continuously performed by at least concurrently performing:

supplying an organic polar solvent, sulfur source, and dihalo aromatic compound in the aforementioned polymerizing step;

producing PAS by polymerizing the sulfur source and dihalo aromatic compound in the organic polar solvent; and recovering a reaction mixture containing the PAS.

Extracting Step and Recovering Step

In the extracting step, an extraction solvent is brought into contact with solid content containing alkali metal halide and the sulfur source, produced in the polymerizing step, and at least a portion of the sulfur source is extracted from the solid content. Herein, the solubility of the sulfur source with regard to the extraction solvent is sufficiently high for removing the sulfur source from the solid content, and the extraction solvent does not dissolve a large portion of the alkali metal halide included in the solid content. A ratio as expressed by (solubility of the sulfur source with regard to the extraction solvent)/(solubility of the alkali metal halide with regard to the extraction solvent) is preferably 0.02 or greater, more preferably 0.1 or greater, and even more preferably 0.3 or greater. When the ratio is within the aforementioned range, the sulfur source can be more efficiently extracted from the solid content, and the solid content with a further reduced amount of the sulfur source can be more easily recovered. An upper limit of the ratio is not particularly limited, and may be 1000 or less or 100 or less. Note that in the alkali metal halide in the solid content, an alkali metal is not particularly limited, and examples include sodium, potassium, and the like. Halogen is not particularly limited, and examples include fluorine, chlorine, iodine, and the like. The alkali metal and halogen may be independently used as one type, or may be combined with two or more types.

In the recovering step, the solid content where at least a portion of the sulfur source is extracted in the extracting step, and an extraction liquid containing the extraction solvent and sulfur source, produced in the extracting step are separated from each other and recovered.

So long as the solubility of the sulfur source with regard to the extraction solvent is sufficiently high for removing the sulfur source from the solid content, and the extraction solvent does not dissolve a large portion of the alkali metal halide included in the solid content, the extraction solvent is not particularly limited, and a protic organic solvent can be used (more specifically, only a protic organic solvent), or a mixed solvent containing water and an organic solvent can be used for example. The extraction solvent, protic organic solvent, and organic solvent may be independently used as one type, or may be combined with two or more types. Of these, the mixed solvent is preferable from the perspective of being able to more efficiently extract the sulfur source. From the perspective of being able to even more efficiently extract the sulfur source, the amount of water in the mixed is preferably 1 part by mass to less than 100 parts by mass, more preferably 2 parts by mass to 75 parts by mass, and even more preferably 3 parts by mass to 50 parts by mass, with regard to 100 parts by mass of the organic solvent.

Examples of the protic organic solvent include alcohols, amines, carboxylic acids, sulfonic acids, and the like.

The organic solvent in the mixed solvent is preferably an organic polar solvent, and more preferably an organic amide solvent, considering efficiency of extracting the sulfur source and reuse of the extracted sulfur source in the polymerizing step. Examples of the organic polar solvent and organic amide solvent include those exemplified above, and from the perspective of efficiency of extracting the sulfur source, NMP is preferable. The organic polar solvent and organic amide solvent may be independently used as one type, or may be combined with two or more types. Furthermore, the protic organic solvent can be used as the organic solvent in the mixed solvent.

In the extracting step, as a result of extracting at least a portion of the sulfur source from the solid content, the solid content with a reduced amount of the sulfur source is obtained. Furthermore, in the extracting step, an extraction liquid containing the extraction solvent and sulfur source is produced.

A method of mutually separating and recovering the solid content and extraction liquid in the recovering step is not particularly limited, and examples include conventionally known solid-liquid separating methods. Specific examples include filtering, sieving, centrifugal separation, and the like. An example of filtering includes filtering using a fiber filter. An example of sieving includes sieving using a screen. An example of centrifugal separation includes centrifugal separation by a centrifugal separator.

A temperature in the extracting step and recovering step is preferably 100° C. or higher, and more preferably 150° C. or higher. When the temperature is 100° C. or higher, the solubility of the sulfur source with regard to the extraction solvent tends to be high, and therefore, the sulfur source can be more efficiently extracted from the solid content, and the solid content with a further reduced amount of the sulfur source can be more easily recovered. An upper limit of the temperature is not particularly limited, and may be 300° C. or lower or 280° C. or lower from the perspective of workability and the like.

The amount of the sulfur source in the solid content recovered in the recovering step is 2 parts by mass or less, and preferably 1 part by mass or less with regard to 100 parts by mass of the alkali metal halide. When the amount of the sulfur source is within the aforementioned range, the alkali metal halide in the solid content has higher purity, and thus disposal can be more easily performed. Examples of the disposal include: discharging the alkali metal halide in the solid content as an aqueous solution; filling the alkali metal halide in soil in the form of a solid content; and using the alkali metal halide in the solid content as a raw material for electrolysis. In particular, in a case where the alkali metal halide in the solid content is used as raw material for electrolysis, the dihalo aromatic compound and sulfur source are respectively produced from a halogen atom and alkali metal hydroxide produced by the electrolysis, and can be used in manufacturing PAS. In other words, the alkali metal halide, which has conventionally been disposed as a byproduct, can be reused as a raw material for manufacturing PAS, and therefore, the processing costs in manufacturing PAS can be reduced.

Recycling Step

In the recycling step, at least a portion of the extraction liquid can be supplied as at least a portion of raw material for producing PAS in the polymerizing step. Thereby, an unreacted sulfur source can be conveniently and easily reused in the polymerizing step, and therefore, the processing costs in manufacturing PAS can be eliminated.

Separating Step

The PAS manufacturing method according to one embodiment of the present invention may comprise a separating step of separating the solid content from the reaction mixture obtained after the polymerizing step, between the polymerizing step and extracting step. At least a portion of the produced PAS and the solid content can be separated by the separating step for example. The method of separating the solid content from the reaction mixture in the separating step is not particularly limited, and examples include methods similar to those exemplified in the recovering step. Furthermore, a temperature in the separating step is not particularly limited, and may be the same as the temperature in the extracting step and recovering step for example.

PAS Manufacturing Device

A PAS manufacturing device according to one embodiment of the present invention, comprises:

a polymerizing part that polymerizes a sulfur source and dihalo aromatic compound in an organic polar solvent to produce PAS;

an extracting part that brings an extraction solvent into contact with solid content produced in the polymerizing part, the solid content containing an alkali metal halide and the sulfur source, and then extracts at least a portion of the sulfur source from the solid content;

a recovering part that mutually separates and recovers the solid content where at least a portion of the sulfur source was extracted in the extracting part, and an extraction liquid containing the extraction solvent and the sulfur source, produced in the extracting part;

wherein the extraction solvent is (1) a protic organic solvent or (2) a mixed solvent containing water and an organic solvent; and the amount of the sulfur source in the solid content recovered in the recovering part is 2 parts by mass or less with regard to 100 parts by mass of the alkali metal halide.

FIG. 1 is a schematic view illustrating one embodiment of a PAS manufacturing device according to one embodiment of the present invention. A configuration and operation of the aforementioned embodiment will be described below based on FIG. 1. Note that a description is omitted for items duplicated between the PAS manufacturing device according to one embodiment of the present invention and PAS manufacturing method according to one embodiment of the present invention.

A PAS manufacturing device 1 according to the aforementioned embodiment is provided with a polymerizing part 2, extracting part 3, recovering part 4, and recycling part 5. Raw material such as an organic polar solvent, sulfur source, dihalo aromatic compound, and the like are supplied through a line 6 to the polymerizing part 2. The polymerizing part 2 polymerizes the sulfur source and dihalo aromatic compound in the organic polar solvent to produce PAS. A reaction mixture containing PAS produced by the polymerizing part 2 supplied to the extracting part 3 through a line 7. The extraction solvent is also supplied through a line 8 to the extracting part 3. The extracting part 3 brings the extraction solvent into contact with solid content containing alkali metal halide and the sulfur source, produced in the polymerizing part 2, and extracts at least a portion of the sulfur source from the solid content. A mixture subjected to an extraction operation of the extracting part 3 is supplied to the recovering part 4 through a line 9. The recovering part 4 mutually separates and recovers the solid content where at least a portion of the sulfur source is extracted in the extracting part 3, and an extraction liquid containing the extraction solvent and sulfur source, produced in the extracting part. The extraction liquid recovered by the recovering part 4 is supplied to the recycling part 5 through a line 10. On the other hand, the solid content recovered by the recovering part 4 is discharged to the outside of the PAS manufacturing device 1 through a line 11. The recycling part 5 supplies at least a portion of the extraction liquid supplied from the recovering part 4 to the polymerizing part 2 through a line 12 as at least a portion of raw material for producing PAS in the polymerizing part 2. The remainder of the extraction liquid is discharged to the outside of the PAS manufacturing device 1 through a line 13.

Summary

A method of manufacturing PAS according to one embodiment of the present invention, comprises:

a polymerizing step of polymerizing a sulfur source and a dihalo aromatic compound in an organic polar solvent to produce PAS;

an extracting step of bringing an extraction solvent into contact with solid content produced in the polymerizing step, the solid content containing an alkali metal halide and the sulfur source, and then extracting at least a portion of the sulfur source from the solid content; and a recovering step of mutually separating and recovering the solid content where at least a portion of the sulfur source was extracted in the extracting step, and an extraction liquid containing the extraction solvent and the sulfur source, produced in the extracting step; wherein the extraction solvent is (1) a protic organic solvent or (2) a mixed solvent containing water and an organic solvent; and the amount of the sulfur source in the solid content recovered in the recovering step is 2 parts by mass or less with regard to 100 parts by mass of the alkali metal halide.

The PAS manufacturing method according to one embodiment of the present invention preferably further comprises a recycling step of supplying at least a portion of the extraction liquid as at least a portion of raw material for producing PAS in the polymerizing step.

In the PAS manufacturing method according to one embodiment of the present invention, the aforementioned polymerizing step preferably concurrently performs:

supplying an organic polar solvent, sulfur source, and dihalo aromatic compound in the aforementioned polymerizing step;

producing PAS by polymerizing the sulfur source and dihalo aromatic compound in the organic polar solvent; and recovering a reaction mixture containing the PAS.

In the PAS manufacturing method according to one embodiment of the present invention, the organic polar solvent is preferably an organic amide solvent.

In the PAS manufacturing method according to one embodiment of the present invention, the sulfur source is preferably at least one type selected from the group consisting of alkali metal sulfides, alkali metal hydrosulfides, and hydrogen sulfide.

In the PAS manufacturing method according to one embodiment of the present invention, the amount of water in the mixed solvent is preferably 1 part by mass to less than 100 parts by mass with regard to 100 parts by mass of the organic solvent.

In the PAS manufacturing method according to one embodiment of the present invention, the organic solvent in the mixed solvent is preferably an organic polar solvent.

In the PAS manufacturing method according to one embodiment of the present invention, a temperature in the extracting step and recovering step is preferably 100° C. or higher.

A PAS manufacturing device according to one embodiment of the present invention, comprises:

a polymerizing part that polymerizes a sulfur source and dihalo aromatic compound in an organic polar solvent to produce PAS;

an extracting part that brings an extraction solvent into contact with solid content produced in the polymerizing part, the solid content containing an alkali metal halide and the sulfur source, and then extracts at least a portion of the sulfur source from the solid content;

a recovering part that mutually separates and recovers the solid content where at least a portion of the sulfur source was extracted in the extracting part, and an extraction liquid containing the extraction solvent and the sulfur source, produced in the extracting part;

wherein the extraction solvent is (1) a protic organic solvent or (2) a mixed solvent containing water and an organic solvent; and the amount of the sulfur source in the solid content recovered in the recovering part is 2 parts by mass or less with regard to 100 parts by mass of the alkali metal halide.

A PAS manufacturing device according to one embodiment of the present invention preferably further includes a recycling part that supplies at least a portion of the extraction liquid as at least a portion of raw material for producing PAS in the polymerizing part.

EXAMPLES

Examples of the present invention will be described in further detail below using examples. The present invention is not limited to the examples below, and it goes without saying that various aspects are possible with regard to the details thereof.

Synthesis Examples

NMP (5507 g), a 62.3 mass % sodium hydrosulfide aqueous solution (2339 g, 26.0 mol), and a 73.5 mass % sodium hydroxide aqueous solution (1399 g, 25.7 mol) were added to a 20 L autoclave, and the inside of the autoclave was substituted with nitrogen. Thereafter, the contents in the autoclave were gradually heated to 200° C. at ambient pressure while stirring, water (1124 g), NMP (691 g), and hydrogen sulfide (0.38 mol) were distilled, and the autoclave was sealed. Next, NMP (2868 g), water (34.7 g), 97.0 mass % sodium hydroxide (15.3 g), and pDCB (3803 g, 25.9 mol) were added in the autoclave. At this time, a composition in the autoclave was 300 g of NMP, 1.3 mol of water, 0.05 mol of sodium hydroxide, and 1.01 mol of pDCB with regard to 1 mol of sodium sulfide produced by reacting sodium hydrosulfide with sodium hydroxide.

The contents inside the autoclave were increased in temperature to 180° C. while stirring in a sealed condition, increased in temperature over 150 minutes from 180° C. to 260° C., and then rapidly cooled to obtain a polymerization mixture.

Example 1

The polymerization mixture (729 g) obtained in the Synthesis Example was added to 1 L autoclave, the inside of the autoclave was substituted with nitrogen, and then the autoclave was sealed. The contents inside the autoclave were increased in temperature to 245° C. while stirring, immediately pressurized by nitrogen (1 MPa), and then filtered by a fiber filter (opening size: 12 μm). The filtration residue inside the autoclave was cooled to approximately 100° C., and then the autoclave was opened.

NMP (500 g) and water (63 g) were introduced in the opened autoclave, the inside of the autoclave was purged with nitrogen, and then the autoclave was sealed. The contents inside the autoclave were increased in temperature to 245° C. while stirring, immediately pressurized by nitrogen (1 MPa), and then filtered by a fiber filter (opening size: 12 μm). The filtration residue inside the autoclave was cooled to approximately 100° C., and then the autoclave was opened. Thereafter, the same operation was repeated one more time.

The obtained filtration residue was dried in a vacuum at 90° C. to obtain a white powder containing byproduct salt. The amount of sodium sulfide in the white powder was 0.24 mass %. The results are shown in Table 1.

Example 2

Other than the amount of water introduced in the opened autoclave was changed from 63 g to 18 g, a white powder containing byproduct salt was obtained similarly to Example 1. The amount of sodium sulfide in the white powder was 0.96 mass %. The results are shown in Table 1.

Comparative Examples

Other than extraction was performed using only NMP without introducing water into the opened autoclave, a white powder containing byproduct salt was obtained similarly to Example 1. The amount of sodium sulfide in the white powder was 2.11 mass %. The results are shown in Table 1.

TABLE 1

| | | | Example 1 | Example 2 | Comparative Example |
|---|---|---|---|---|---|
| Extraction solvent | Amount of NMP | g | 500 | 500 | 500 |
| | | part by mass | 100 | 100 | 100 |
| | Amount of water | g | 63.0 | 18.0 | 0.0 |
| | | mol | 3.5 | 1.0 | 0.0 |
| | | part by mass | 12.6 | 3.6 | 0.0 |
| White powder | Sulfur Concentration (As calculated by $Na_2S$ mass) | mass % | 0.24 | 0.96 | 2.11 |
| | Amount of NaCl | part by mass | 100 | 100 | 100 |
| | Amount of $Na_2S$ | part by mass | 0.24 | 0.97 | 2.16 |
| Extraction liquid | Sulfur Concentration (As calculated by $Na_2S$ mass) | mass % | 0.26 | 0.17 | 0.00 |
| | Amount of NMP | g | 1000 | 1000 | 1000 |
| | Amount of $Na_2S$ | g | 2.88 | 1.73 | 0.04 |

Example 3

563 g of the extraction liquid (where the sulfur concentration as calculated as $Na_2S$ mass was 0.26 mass %, and containing 11.2 mass % of water) obtained in Example 1, a 62.3 mass % sodium hydrosulfide aqueous solution (210 g, 1.68 mol), and a 73.5 mass % sodium hydroxide aqueous solution (87 g, 1.59 mol) were added to a 1 L autoclave, and then the inside of the autoclave was substituted with nitrogen. Thereafter, the contents in the autoclave were gradually heated to 200° C. at ambient pressure while stirring, water (131.7 g), NMP (39.6 g), and hydrogen sulfide (0.03 mols) were distilled, and the autoclave was sealed. Next, NMP (39.6 g), water (5.3 g), 97.0 mass % sodium hydroxide (5.8 g), and pDCB (247.5 g, 1.68 mol) were added in the autoclave. At this time, a composition in the autoclave was 300 g of NMP, 1.3 mol of water, 0.05 mol of sodium hydroxide, and 1.01 mol of pDCB with regard to a total of 1 mol of sodium sulfide produced by reacting sodium hydrosulfide with sodium hydroxide, and sodium sulfide included in the extraction liquid.

The contents inside the autoclave were increased in temperature to 180° C. while stirring in a sealed condition, increased in temperature over 150 minutes from 180° C. to 260° C., and then rapidly cooled to obtain a polymerization mixture. At this time, the obtained polymerization mixture was not different from the polymerization mixture obtained in the Synthesis Example.

Example 4

Figure 2A:
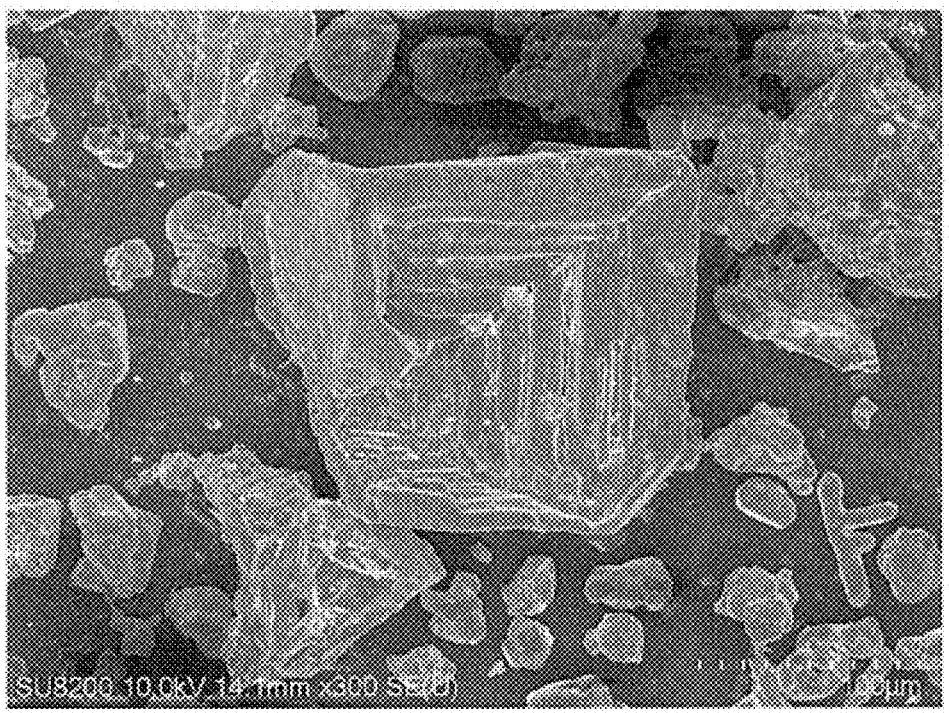
FIG. 2A and FIG. 2B provide photographs showing a result of SEM (scanning electron microscope) observation performed on solid content containing an unreacted sulfur source and alkali metal halide produced as a byproduct when manufacturing PAS.
Figure 2B:
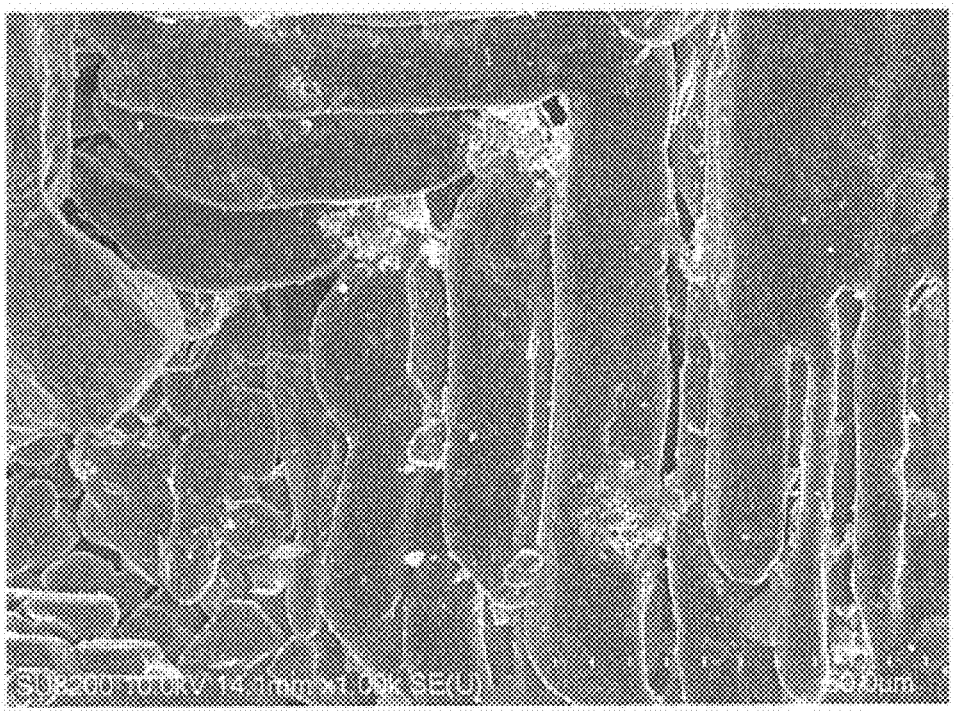

SEM (scanning electron microscope) observation and element mapping based on SEM/EDX (scanning electron microscope/energy dispersive X-ray spectrometry were performed for the white powder obtained in the Comparative Example, FIG. 2A and FIG. 2B show the results of the SEM observation, and FIGS. 3A to 3E show the results of the element mapping based on SEM/EDX.

Figure 3A:
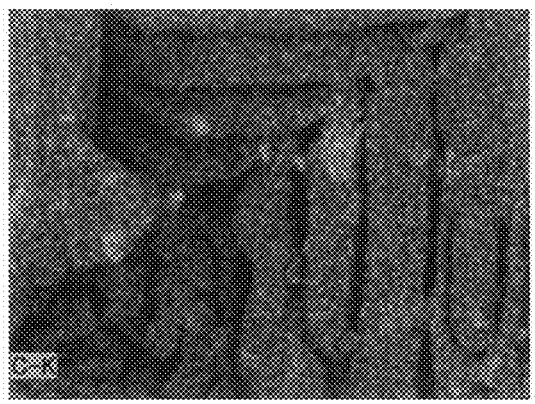
FIG. 3A, FIG. 3B, FIG. 3C, FIG. 3D, and FIG. 3E provide photographs showing a result of element mapping based on SEM/EDX (scanning electron microscope/energy dispersive X-ray spectrometry) performed for the same solid content as FIG. 2A and FIG. 2B.
Figure 3B:
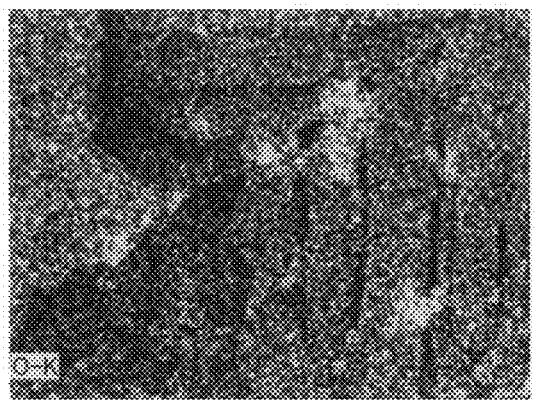
Figure 3C:
Figure 3D:
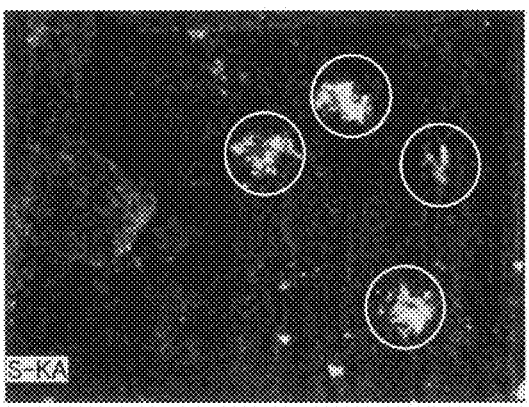
Figure 3E:
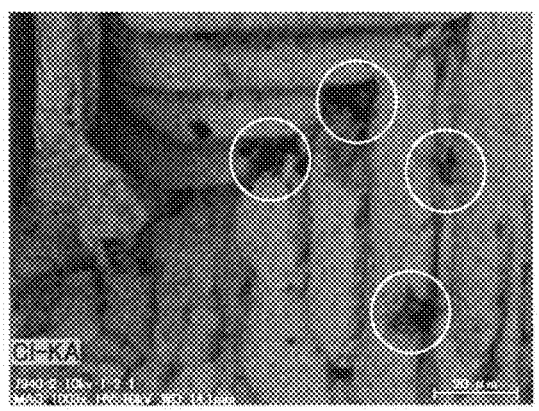

As shown by the circles in FIG. 3D and FIG. 3E, chlorine (Cl) is observed to not be present in a portion where sulfur (S) is present. Sodium (Na) is present in the same portion, and therefore, the white powder has a large portion that contains sodium chloride, and thus sulfur is suggested to be present as sodium sulfide and/or sodium hydrosulfide in a portion on a surface.

From the aforementioned observation, in the present invention, the unreacted sulfur source present on a surface of the solid content containing alkali metal halide produced as a byproduct when manufacturing PAS is hypothesized to be selectively extracted by the extraction solvent, and therefore, the solid content with a reduced amount of the sulfur source is obtained.

REFERENCE SIGNS LIST

1 PAS manufacturing device
2 Polymerizing part
3 Extracting part
4 Recovering part
5 Recycling part
6 to 13 Line

The invention claimed is:
1. A method of manufacturing polyarylene sulfide, comprising:
a polymerizing step of polymerizing a sulfur source and a dihalo aromatic compound in an organic polar solvent to produce polyarylene sulfide;
an extracting step of bringing an extraction solvent into contact with solid content produced in the polymerizing step, the solid content containing an alkali metal halide and the sulfur source, and then extracting at least a portion of the sulfur source from the solid content; and
a recovering step of mutually separating and recovering the solid content where at least a portion of the sulfur source was extracted in the extracting step, and an extraction liquid containing the extraction solvent and the sulfur source, produced in the extracting step; wherein
the extraction solvent is (1) a protic organic solvent or (2) a mixed solvent containing water and an organic solvent; and
the amount of the sulfur source in the solid content recovered in the recovering step is 2 parts by mass or less with regard to 100 parts by mass of the alkali metal halide.

2. The method according to claim 1, concurrently performing:
supplying at least an organic polar solvent, sulfur source, and dihalo aromatic compound in the aforementioned polymerizing step;
producing polyarylene sulfide by polymerizing the sulfur source and dihalo aromatic compound in the organic polar solvent; and
recovering a reaction mixture containing the polyarylene sulfide.

3. The method according to claim 1, wherein the organic polar solvent is an organic amide solvent.

4. The method according to claim 1, wherein the sulfur source is at least one type selected from the group consisting of alkali metal sulfides, alkali metal hydrosulfides, and hydrogen sulfide.

5. The method according to claim 1, wherein the amount of water in the mixed solvent is 1 part by mass to less than 100 parts by mass with regard to 100 parts by mass of the organic solvent.

6. The method according to claim 4, wherein the organic solvent in the mixed solvent is an organic polar solvent.

7. The method according to claim 1, wherein the temperature in the extracting step and recovering step is 100° C. or higher.

8. The method according to claim 1, wherein at least a portion of the extraction liquid used as at least a portion of raw material for producing polyarylene sulfide in the polymerizing step.

9. A polyarylene sulfide manufacturing device, comprising:
a polymerizing part that polymerizes a sulfur source and dihalo aromatic compound in an organic polar solvent to produce polyarylene sulfide;
an extracting part that brings an extraction solvent into contact with solid content produced in the polymerizing part, the solid content containing an alkali metal halide and the sulfur source, and then extracts at least a portion of the sulfur source from the solid content;
a recovering part that mutually separates and recovers the solid content where at least a portion of the sulfur source was extracted in the extracting part, and an extraction liquid containing the extraction solvent and the sulfur source, produced in the extracting part; wherein
the extraction solvent is (1) a protic organic solvent or (2) a mixed solvent containing water and an organic solvent; and
the amount of the sulfur source in the solid content recovered in the recovering part is 2 parts by mass or less with regard to 100 parts by mass of the alkali metal halide.

10. The polyarylene sulfide manufacturing device according to claim 9, comprising:
a recycling part that supplies at least a portion of the extraction liquid as at least a portion of raw material for producing polyarylene sulfide in the polymerizing part.

* * * * *